United States Patent
Koka et al.

(10) Patent No.: US 8,239,443 B2
(45) Date of Patent: Aug. 7, 2012

(54) METHOD AND SYSTEM FOR TUNABLE DISTRIBUTION OF CONTENT

(75) Inventors: Vikram Venkata Koka, Fremont, CA (US); Milton C. Soong, Los Altos, CA (US); Neil A. King, Fremont, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 71 days.

(21) Appl. No.: 12/551,717

(22) Filed: Sep. 1, 2009

(65) Prior Publication Data

US 2011/0055934 A1    Mar. 3, 2011

(51) Int. Cl.
G06F 15/16    (2006.01)
(52) U.S. Cl. .......... 709/201; 709/203; 709/204; 705/59; 726/28
(58) Field of Classification Search ................... 709/203, 709/201, 204; 726/28
See application file for complete search history.

(56) References Cited

U.S. PATENT DOCUMENTS

| | | | |
|---|---|---|---|
| 7,277,766 B1 | 10/2007 | Khan et al. | |
| 7,451,078 B2 | 11/2008 | Bogdanov | |
| 2003/0120634 A1 | 6/2003 | Koike et al. | |
| 2004/0220926 A1* | 11/2004 | Lamkin et al. | 707/3 |
| 2006/0129496 A1* | 6/2006 | Chow et al. | 705/59 |
| 2009/0182815 A1 | 7/2009 | Czechowski, III et al. | |

OTHER PUBLICATIONS

International Search Report for International application No. PCT/US2010/047101, mailed Dec. 3, 2010, 2 pages.

* cited by examiner

*Primary Examiner* — Kyung H Shin
(74) *Attorney, Agent, or Firm* — Schwegman, Lundberg & Woessner, P.A.

(57) ABSTRACT

A method and system for tunable distribution of content are disclosed. Preferably, the content comprises digital rights and/or watermark information. In one embodiment, a computer-implemented method comprises receiving a request from a client. One or more content files related to the request and a user profile of a user are determined. One or more seeders are assigned to start the delivery of the one or more content files. The client is allowed to obtain a plurality of pieces of the one or more content files from the one or more seeders. At least one piece of the plurality of pieces of the one or more content files contains digital rights and/or watermark information.

24 Claims, 5 Drawing Sheets

METHOD AND SYSTEM FOR TUNABLE DISTRIBUTION OF CONTENT

FIELD

The field of the invention relates generally to computer systems, and more particularly, to a method and system for tunable distribution of content.

BACKGROUND

Peer-to-peer file sharing is a data exchange infrastructure that allows exchange of information among computers without a central network structure. Every machine connected to the peer-to-peer network contains a client and a server capability to request information from and serve information to other machines of similar configuration. Generally, peer-to-peer networks are organized loosely without any centralized management authority. This allows any client to attach to the network and share files with other clients. It also allows any client to request a shared file from other clients having similar characteristics.

BRIEF DESCRIPTION OF THE DRAWINGS

The accompanying drawings, together with the detailed description serve to illustrate principles of the invention.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

Today's multimedia files are much bigger and have increased resolution and features. Consequently, it is an important feature of a file sharing and/or distribution system to deliver pieces of a file to a client from multiple points, sources, and/or peers and allow the client to assemble and reconstruct the file on his/her machine. A specific signature for each delivered piece of the file is utilized as an identification. For example, the file name and size, creation date, last edit date, or other meta data, is used to verify that the piece of the file delivered from a resource is indeed a part of the intended file. Despite the inherent advantages of multipoint, multisource, and/or peer-to-peer file sharing systems, content distribution by these systems may suffer because of poor content management. For instance, since most multipoint file sharing systems are based on a decentralized server-client model, a content publisher or a content manager cannot precisely trace the number of authorized accesses. In addition, users are concerned with the safety of the file delivery since it is not centrally controlled and managed. For instance, when a tiny piece of a file delivered from an unknown source is corrupt or infected with a computer virus, the whole file becomes not only useless but also harmful to the user who unknowingly obtained the corrupted file containing the computer virus.

The lack of a centralized management authority makes the optimization of file sharing and delivery over a network more difficult. When the serving party might be several hops away from the requesting party on the network, the speed of the file delivery is dependent on the network traffic. The serving party might be geographically far away, thus the network bandwidth of the requesting party might be severely underutilized. In particular, when there are multiple resources available, it is important to identify which resource is capable of providing the fastest connection so as to maximize the network bandwidth of the requesting party.

A method and system for tunable distribution of content such as by using a multipoint distribution mechanism is disclosed. Preferably, the content comprises digital rights management (DRM) and/or watermark information. In one embodiment, a computer-implemented method comprises receiving a request from a client. One or more content files related to the request and a user profile of a user are determined. One or more seeders are assigned to start the delivery of the one or more content files. The client is allowed to obtain a plurality of pieces of the one or more content files from the one or more seeders. At least one piece of the plurality of pieces of the one or more content files contains digital rights and/or watermark information.

In the following description, for purposes of explanation, specific nomenclature is set forth to provide a thorough understanding of the various inventive concepts disclosed herein. However, it will be apparent to one skilled in the art that these specific details are not required in order to practice the various inventive concepts disclosed herein.

Definitions

Some terms are defined below in alphabetical order for easy reference. These terms are not rigidly restricted to these definitions. A term may be further defined by its use in other sections of this description.

"Album" means a collection of tracks. An album is typically originally published by an established entity, such as a record label (e.g., a recording company such as Warner Brothers and Universal Music).

"Audio Fingerprint" (e.g., "fingerprint", "acoustic fingerprint", "digital fingerprint") is a digital measure of certain acoustic properties that is deterministically generated from an audio signal that can be used to identify an audio sample and/or quickly locate similar items in an audio database. An audio fingerprint typically operates as a unique identifier for a particular item, such as, for example, a CD, a DVD and/or a Blu-ray Disc. The term "identifier" is defined below. An audio fingerprint is an independent piece of data that is not affected by metadata. ROVI™ Corporation has databases that store over 25 million unique fingerprints for various audio samples. Practical uses of audio fingerprints include without limitation identifying songs, identifying records, identifying melodies, identifying tunes, identifying advertisements, monitoring radio broadcasts, monitoring multipoint and/or peer-to-peer networks, managing sound effects libraries and identifying video files.

"Audio Fingerprinting" is the process of generating an audio fingerprint. U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. Pat. No. 7,451,078 (the '078 patent), entitled "Methods and Apparatus for Identifying Media Objects", which is herein incorporated by reference, provides an example of an apparatus for generating an audio fingerprint of an audio recording.

"Blu-ray", also known as Blu-ray Disc, means a disc format jointly developed by the Blu-ray Disc Association, and personal computer and media manufacturers including Apple, Dell, Hitachi, HP, JVC, LG, Mitsubishi, Panasonic, Pioneer, Philips, Samsung, Sharp, Sony, TDK and Thomson. The format was developed to enable recording, rewriting and playback of high-definition (HD) video, as well as storing large amounts of data. The format offers more than five times the storage capacity of conventional DVDs and can hold 25 GB on a single-layer disc and 800 GB on a 20-layer disc. More layers and more storage capacity may be feasible as well. This extra capacity combined with the use of advanced audio and/or video codecs offers consumers an unprecedented HD experience. While current disc technologies, such as CD and DVD, rely on a red laser to read and write data, the Blu-ray format uses a blue-violet laser instead, hence the name Blu-ray. The benefit of using a blue-violet laser (605 nm) is that it has a shorter wavelength than a red laser (650 nm). A shorter wavelength makes it possible to focus the laser spot with greater precision. This added precision allows data to be packed more tightly and stored in less space. Thus, it is possible to fit substantially more data on a Blu-ray Disc even though a Blu-ray Disc may have the substantially similar physical dimensions as a traditional CD or DVD.

"Chapter" means an audio and/or video data block on a disc, such as a Blu-ray Disc, a CD or a DVD. A chapter stores at least a portion of an audio and/or video recording.

"Compact Disc" (CD) means a disc used to store digital data. A CD was originally developed for storing digital audio. Standard CDs have a diameter of 740 mm and can typically hold up to 80 minutes of audio. There is also the mini-CD, with diameters ranging from 60 to 80 mm. Mini-CDs are sometimes used for CD singles and typically store up to 24 minutes of audio. CD technology has been adapted and expanded to include without limitation data storage CD-ROM, write-once audio and data storage CD-R, rewritable media CD-RW, Super Audio CD (SACD), Video Compact Discs (VCD), Super Video Compact Discs (SVCD), Photo CD, Picture CD, Compact Disc Interactive (CD-i), and Enhanced CD. The wavelength used by standard CD lasers is 650 nm, and thus the light of a standard CD laser typically has a red color.

"Database" means a collection of data organized in such a way that a computer program may quickly select desired pieces of the data. A database is an electronic filing system. In some implementations, the term "database" may be used as shorthand for "database management system".

"Device" means software, hardware or a combination thereof. A device may sometimes be referred to as an apparatus. Examples of a device include without limitation a software application such as MICROSOFT WORD™, a laptop computer, a database, a server, a display, a computer mouse, and a hard disk. Each device is configured to carry out one or more steps of the method of storing an internal identifier in metadata.

"Digital Video Disc" (DVD) means a disc used to store digital data. A DVD was originally developed for storing digital video and digital audio data. Most DVDs have the substantially similar physical dimensions as compact discs (CDs), but DVDs store more than six times as much data. There is also the mini-DVD, with diameters ranging from 60 to 80 mm. DVD technology has been adapted and expanded to include DVD-ROM, DVD-R, DVD+R, DVD-RW, DVD+RW and DVD-RAM. The wavelength used by standard DVD lasers is 650 nm, and thus the light of a standard DVD laser typically has a red color.

"Fuzzy search" (e.g., "fuzzy string search", "approximate string search") means a search for text strings that approximately or substantially match a given text string pattern. Fuzzy searching may also be known as approximate or inexact matching. An exact match may inadvertently occur while performing a fuzzy search.

"Signature" means an identifying means that uniquely identifies an item, such as, for example, a track, a song, an album, a CD, a DVD and/or Blu-ray Disc, among other items. Examples of a signature include without limitation the following in a computer-readable format: an audio fingerprint, a portion of an audio fingerprint, a signature derived from an audio fingerprint, an audio signature, a video signature, a disc signature, a CD signature, a DVD signature, a Blu-ray Disc signature, a media signature, a high definition media signature, a human fingerprint, a human footprint, an animal fingerprint, an animal footprint, a handwritten signature, an eye print, a biometric signature, a retinal signature, a retinal scan, a DNA signature, a DNA profile, a genetic signature and/or a genetic profile, among other signatures. A signature may be any computer-readable string of characters that comports with any coding standard in any language. Examples of a coding standard include without limitation alphabet, alphanumeric, decimal, hexadecimal, binary, American Standard Code for Information Interchange (ASCII), Unicode and/or Universal Character Set (UCS). Certain signatures may not initially be computer-readable. For example, latent human fingerprints may be printed on a door knob in the physical world. A signature that is initially not computer-readable may be converted into a computer-readable signature by using any appropriate conversion technique. For example, a conversion technique for converting a latent human fingerprint into a computer-readable signature may include a ridge characteristics analysis.

"Link" means an association with an object or an element in memory. A link is typically a pointer. A pointer is a variable that contains the address of a location in memory. The location is the starting point of an allocated object, such as an object or value type, or the element of an array. The memory may be located on a database or a database system. "Linking" means associating with (e.g., pointing to) an object in memory.

"Metadata" generally means data that describes data. More particularly, metadata may be used to describe the contents of digital recordings. Such metadata may include, for example, a track name, a song name, artist information (e.g., name, birth date, discography), album information (e.g., album title, review, track listing, sound samples), relational information (e.g., similar artists and albums, genre) and/or other types of supplemental information. Conventional optical discs (e.g., CDs, DVDs, Blu-ray Discs) do not typically contain metadata. Metadata may be associated with a digital recording (e.g., song, album, movie or video) after the digital recording has been ripped from an optical disc, converted to another digital audio format and stored on a hard drive.

"Network" means a connection between any two or more computers, which permits the transmission of data. A network may be any combination of networks, including without limitation the Internet, a local area network, a wide area network, a wireless network and a cellular network.

"Occurrence" means a copy of a recording. An occurrence is preferably an exact copy of a recording. For example, different occurrences of a same pressing are typically exact copies. However, an occurrence is not necessarily an exact copy of a recording, and may be a substantially similar copy. A recording may be an inexact copy for a number of reasons, including without limitation an imperfection in the copying process, different pressings having different settings, different copies having different encodings, and other reasons. Accordingly, a recording may be the source of multiple occurrences that may be exact copies or substantially similar copies. Different occurrences may be located on different devices, including without limitation different user devices, different MP3 players, different databases, different laptops, and so on. Each occurrence of a recording may be located on any appropriate storage medium, including without limitation floppy disk, mini disk, optical disc, Blu-ray Disc, DVD, CD-ROM, micro-drive, magneto-optical disk, ROM, RAM, EPROM, EEPROM, DRAM, VRAM, flash memory, flash card, magnetic card, optical card, nano systems, molecular memory integrated circuit, RAID, remote data storage/archive/warehousing, and/or any other type of storage device. Occurrences may be compiled, such as in a database or in a listing.

"Pressing" (e.g., "disc pressing") means producing a disc in a disc press from a master. The disc press preferably includes a laser beam having a bandwidth of about 650 nm for DVD or about 605 nm for Blu-ray Disc.

"Recording" means media data for playback. A recording is preferably a computer readable digital recording and may be, for example, an audio track, a video track, a song, a chapter, a CD recording, a DVD recording and/or a Blu-ray Disc recording, among other things.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware, or a combination thereof. Computer readable media are discussed in more detail in a separate section below.

"Song" means a musical composition. A song is typically recorded onto a track by a record label (e.g., recording company). A song may have many different versions, for example, a radio version and an extended version.

"System" means a device or multiple coupled devices. A device is defined above.

"Track" means an audio/video data block. A track may be on a disc, such as, for example, a Blu-ray Disc, a CD or a DVD.

"User" means a consumer, client, and/or client device in a marketplace of products and/or services.

"User device" (e.g., "client", "client device", "user computer") is a hardware system, a software operating system and/or one or more software application programs. A user device may refer to a single computer or to a network of interacting computers. A user device may be the client part of a client-server architecture. A user device typically relies on a server to perform some operations. Examples of a user device include without limitation a CD player, a DVD player, a Blu-ray Disc player, a personal media device, a portable media player, an IPOD™, a Zoom Player, a laptop computer, a palmtop computer, a smart phone, a cell phone, a mobile phone, an MP3 player, a digital audio recorder, a digital video recorder, an IBM-type personal computer (PC) having an operating system such as MICROSOFT WINDOWS™, an APPLE™ computer having an operating system such as MAC-OS, hardware having a JAVA-OS operating system, and a Sun Microsystems Workstation having a UNIX operating system.

"Web browser" means any software program which can display text, graphics, or both, from Web pages on Web sites. Examples of a Web browser include without limitation MOZILLA FIREFOX™ and Microsoft Internet EXPLORER™.

"Web page" means any documents written in mark-up language including without limitation HTML (hypertext mark-up language) or VRML (virtual reality modeling language), dynamic HTML, XML (extended mark-up language) or related computer languages thereof, as well as to any collection of such documents reachable through one specific Internet address or at one specific Web site, or any document obtainable through a particular URL (Uniform Resource Locator).

"Web server" refers to a computer or other electronic device which is capable of serving at least one Web page to a Web browser. An example of a Web server is a Yahoo™ Web server.

"Web site" means at least one Web page, and more commonly a plurality of Web pages, virtually coupled to form a coherent group.

System Architecture

Figure 1:
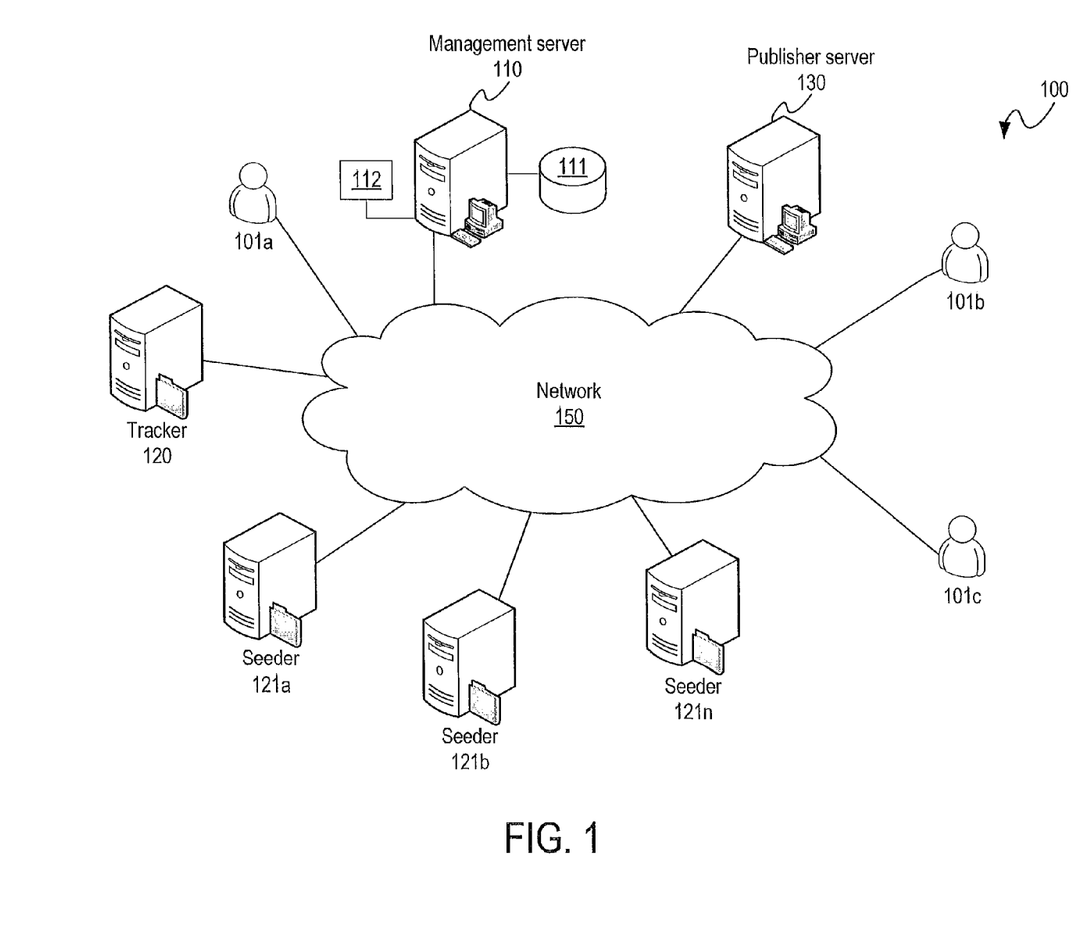
FIG. 1 illustrates an exemplary tunable content distribution system using a multipoint mechanism, according to one embodiment.

FIG. 1 illustrates an exemplary tunable content distribution system using a multipoint mechanism, according to one embodiment. Distributed content (e.g., MP3 audio files, DVD movie files) preferably has digital rights management (DRM) information or is watermarked to provide content security and traceability. Digital rights management refers to access control technologies used by hardware manufacturers, publishers, or copyright holders to impose limitations on the usage of digital content and devices. A tunable content distribution system 100 and clients 101*a*, 101*b* and 101*c*, are coupled by a network 150, such as, for example, the Internet. The clients 101*a*, 101*b* and 101*c*, are also referred to as points, sources, and/or peers. The tunable content distribution system 100 also includes management server 110 and database 111 coupled thereto, a tracker 120 and multiple seeders 121. In one implementation, the tracker 120 and seeders 121*a*, 121*b*, . . . 121*n*, are part of a BitTorrent system. BitTorrent is a peer-to-peer file sharing communication protocol popular for managed digital content distribution offered by BitTorrent Inc. of San Francisco, Calif. BitTorrent is shown herein as an example only, thus the present invention need not be restricted thereto and other multipoint and/or multisource systems may be used to practice the present subject matter such as the BD-Live system, for example.

The network 150 may use a variety of protocols and/or applications including HyperText Transfer Protocol (HTTP), File Transfer Protocol (FTP), Internet Relay Chat (IRC), etc., via a TCP/IP connection or UDP/IP packets (not shown in this view). Although the network 150 is described herein as being the Internet, alternatively, the network 150 may be a Wide Area Network (WAN), a Local Area Network (LAN), or another system of interconnections enabling two or more computers or network devices to exchange information. Further, the network 150 may include a wireless network, such that one or more of the client devices may be wireless devices.

According to one embodiment, the tunable content distribution system 100 is used for distribution and delivery of multimedia files. The multimedia files may be delivered on demand or by broadcasting, downloading and/or streaming. It is appreciated that other forms of content delivery may be adopted without deviating from the scope of the present subject matter, and the applications of the content delivery mechanisms are not limited to the examples and embodiments disclosed herein. A client 101a, upon the purchase of a multimedia file, presents the proof of purchase such as a license, for example, to a management server 110. The management server 110, according to one embodiment, is coupled to an authorizing server or an E-commerce server (not shown) to verify the purchase of the multimedia file. Upon the verification of the purchase and/or subsequent notification thereof, e.g., a validation of a license, the client 101a is allowed to start downloading or streaming the multimedia file. The download or streaming process may be initiated by the management server 110 that instructs the tracker 120 to locate the multimedia file or the pieces of the multimedia file distributed to the seeders 121. The management server 110 and the tracker 120 may be co-located in a single server.

According to one embodiment, the seeders 121 are strategically distributed over the network 150 to serve the clients 101 coupled to the network 150 from many different locations. A certain multimedia file may be co-located on a plurality of seeders 121. Depending on the client's location and bandwidth, an appropriate set of seeders 121 is assigned. For instance, the user's geographical location is tracked by the IP address of the user's computer such as, for example, the client 101a, and the seeder 121 in the client's 101a closest proximity is assigned. According to another embodiment, the seeders' 121 bandwidth is monitored by the tracker 120, and depending on the size of the requested file and the client's 101a network bandwidth, an appropriate seeder 121 is assigned.

If the assigned seeder 121 is busy or becomes busy or unavailable, the next available seeder 121 that has enough bandwidth to process the request is assigned. Oftentimes, more than one seeder 121 is assigned to allow faster delivery. During the file delivery, client 101a may stay coupled to the tracker 120 so that the management server 110 keeps monitoring the connectivity and the availability of the seeders 121 and the download or streaming progress. Each seeder 121 may communicate individually with the tracker 120 and report its status to the management server 110. Mechanisms for assigning and monitoring the seeders 121 are available to facilitate the file transfer process.

According to one embodiment, the management server 110 adaptively distributes content depending on demand and popularity. The management server 110 or the tracker 120 may dynamically track the demand and popularity of a specific file by counting the number of requests. When the demand for a certain file becomes higher, more seeders 121 are assigned to host the file. On the other hand, when the demand is lower, the storage space of the scarcely-requested files on the seeder 121 is replaced with more frequently-requested files. In one example, a popular movie releases for the DVD format and/or for the Blu-ray Disc format, and many viewers obtain the movie using the tunable content distribution system 100. In the area the movie is popular, the seeders 121 serving the area may host the movie until the demand is lower. The proper maintenance of the content files and the continuous adaptation to the demand are similar to the inventory management of a warehouse.

According to one embodiment, content management of the tunable content distribution system 100 is performed by a content management module 112. The content management module 112 may determine when to upload, replace, change content at the seeders 121 by dynamically monitoring the demand level of the content being distributed. Alternatively, the content management module 112 may set up a pre-determined policy to control the content distribution based on a model. For example, when a new movie is released for the DVD and/or Blu-ray format, the location and the number of the seeders 121 are determined based on the success at the box office.

According to one embodiment, the tracker 120 operates as a network traffic manager between the clients 101 and the seeders 121. When the requested file is co-located in the seeders 121a, 121b and 121n, the requested file maybe simultaneously obtained in pieces from them. Each seeder 121 monitors the progress of the file delivery and reports the result to the tracker 120. The tracker 120 determines the success or the failure of the delivery by collaboratively compiling the results from each seeder 121 and reports the results to the management server 110.

According to one embodiment, while a client 101a continues to download or stream a file, a client 101b sends a request to the management server 110 to download or stream the same file. The management server 110 delegates the tracker 120 to assign a seeder 121 and redirect the request to the assigned seeder 121 to allow the client 101b to start downloading or streaming. The client 101b might be allowed to establish a simultaneous connection to a plurality of seeders 121.

When the client 101b is geographically closer to the client 101a, the tracker 120 may redirect the request of the client 101b to the client 101a instead of assigning a seeder 121. This is particularly advantageous when the client 101a has an uploading port available and is capable of providing a faster connection to the client 101b than any other seeder 121 available on the tunable content distribution system 100. Typically, a client's uploading or up-streaming and downloading and down-streaming packets are on separate ports, thus downloading or down-streaming a file is minimally impacted by uploading or up-streaming another file or the same file.

Similarly, a client 101c sends a request for the same file to the management server 110. If the tracker 120 finds that a particular seeder 121 is available and is capable of providing a faster connection than other points on the network 150, including the clients 101a and 101b, then the client 101c's request is assigned to the particular seeder 121 instead of allowing a peer-to-peer connection. Other reasons such as unavailability of seeders, the user's preference, network bandwidth, and the like, should be considered to determine to commence delivery of the file from other points, sources, and/or peers.

According to one embodiment, the network 150 is a home network, and the clients 101 may be substituted with network devices distributed in a home. For example, the client 101a is a set-top box in a living room; the client 101*b* is a network-capable refrigerator in the kitchen. In this example, the seeders 121 might be substituted with the network devices in the home, each of which advantageously serves as a content distribution server. In one example, the home owner plays a recently downloaded media such as an MP3 music file by using a network-capable Blu-ray player in the audio-room. The media is preferably downloaded to a home network server such as, for example, the management server 110, and available from an iPod player and from the refrigerator. The Blu-ray player downloads and/or streams the media file from various locations including from the home network server, the iPod player, and/or the refrigerator, and advantageously plays the media file, which in this case comprises a song in the form of an audio media file.

According to one embodiment, content distributed by the tunable content distribution system 100 is in a "BD+" format. The "BD+" format is a component of the Blu-ray digital rights management system developed by Cryptography Research Inc. of San Francisco, and by Rovi Corporation, of Santa Clara, both of Calif.

According to one embodiment, content distributed by the tunable content distribution system 100 is a Blu-ray disc movie. Some Blu-ray discs and/or players provide access to one or more "BD-Live" features. "BD-Live" is a Blu-ray feature that enables a client to access content via an Internet-enabled device such as, for example, a Blu-ray player. BD-Live allows a client to download or stream a preview, updates, bonus features for a Blu-ray movie, or other digital content.

The BD-Live feature provides flexibility and expandability to the existing Blu-ray format. According to one embodiment, a user purchases a regular version of a Blu-ray movie on a disc. While playing the move, the user's BD-Live capable Blu-ray player may communicate with the management server 110. The management server 110 authenticates that the user's Blu-ray player is authorized to access additional content associated with the movie. The authentication process may be performed automatically by using rights information, digital rights management information, and/or a watermark on the purchased Blu-ray movie. Alternatively, the user provides a valid proof of purchase to the management server 110. After being approved by the management server 110, the user's Blu-ray player is authorized to start to download or stream content including, for instance, a director's cut, special features that are unavailable on the distributed disc, and/or other special content and features. Further, when the user's Blu-ray player plays the Blu-ray movie, different or updated content might be available for download or streaming, for example a trailer of a new movie.

Figure 2:
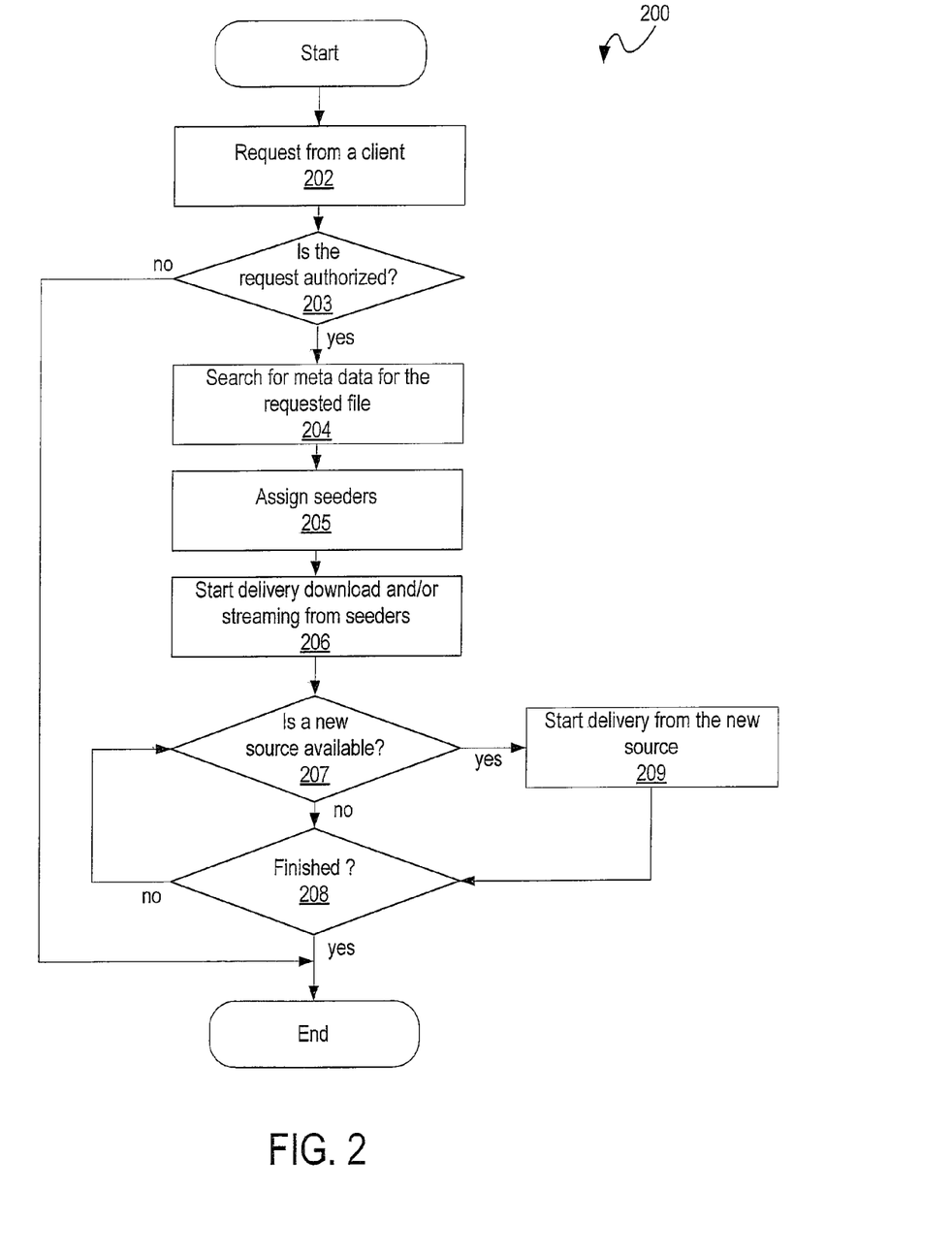
FIG. 2 illustrates a flow chart of an exemplary content distribution process using a tunable content distribution system, according to one embodiment.

FIG. 2 illustrates a flow chart of an exemplary content distribution process 200 using a tunable content distribution system, according to one embodiment. The process 200 begins when a client sends a request to a management server to obtain a file with a proof of purchase of the file (at a step 202). If the management server authorizes the client's request (step 203), meta data for the requested file is searched in a database (step 204), and appropriate seeder(s) is/are assigned (step 205). The tracker establishes communication with the assigned seeder(s) and the download or streaming is started (step 206). When a new source such as, for example, another client who can provide a piece of the requested file or another seeder that can provide faster download or streaming, becomes available (step 207), the new source also participates in the download or streaming process (209). After the client finishes downloading or streaming (step 208), the tracker confirms the completion of the download or streaming and reports this to the management server, and the process 200 concludes. If, at the step 203, the request is not authorized, then the process 200 concludes without delivery of the requested file.

Figure 3:
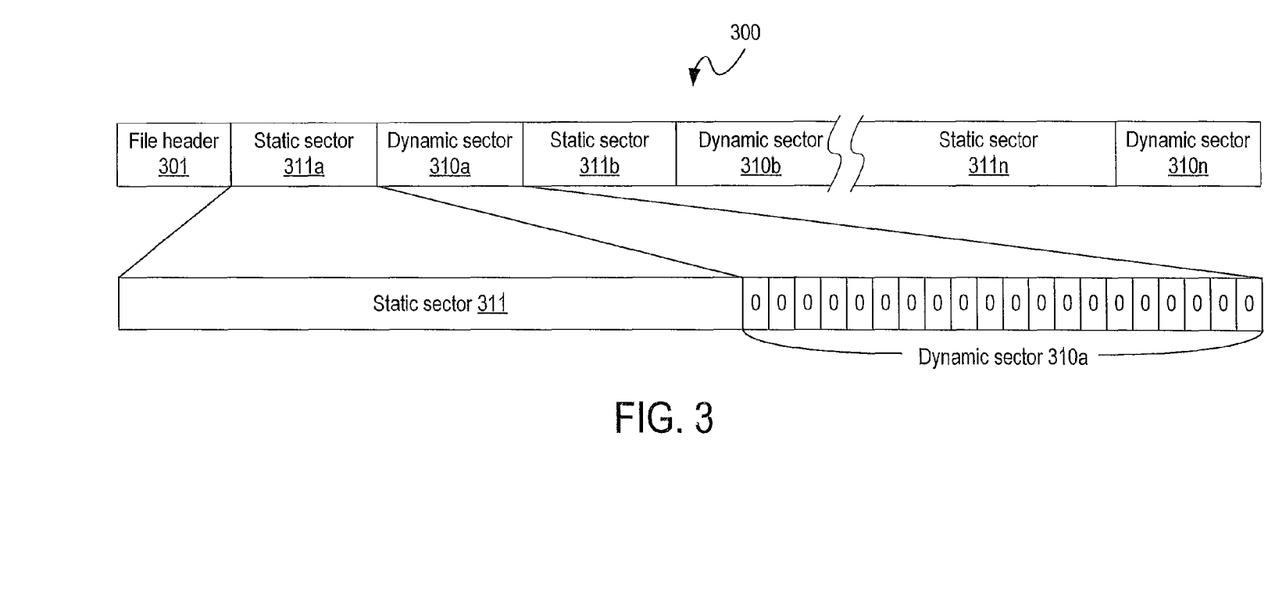
FIG. 3 shows an exemplary file structure of a digital content file, according to one embodiment.

FIG. 3 shows an exemplary file structure of a digital content file, according to one embodiment. Preferably, the content file 300 comprises digital rights and/or management information. Each content file 300 contains a plurality of dynamic sectors 310 and static sectors 311. The content file 300 may be provided and distributed to clients 101 by a tunable content distribution system 100 as described above in relation to FIG. 1. According to one embodiment, a dynamic sector 310 of the content file 300 is provided by a publisher server 130. In another embodiment, the publisher server 130 is one of the seeders 121. Alternatively, the publisher server 130 is a management server 110. The publisher server 130 effectively embeds DRM and/or rights information or a watermark into the content file 300 such that the management server 110 and the tracking server 120 can trace and manage the distribution of the content file 300.

According to one embodiment, the publisher server 130 is responsible for tunable distribution of a content file 300. For example, the designated seeders such as, for example the clients 101, are responsible for the distribution of static sectors 311 of the content file 300, but the dynamic sectors 310 of the content file 300 are distributed by the publisher server 130 or under the control of a publisher server. The static sectors 311 alone may not be sufficient to reconstruct the content file 300.

Each dynamic sector 310 may contain unique identifiers (IDs) containing the identity of the sector itself and the content file 300 to which it belongs. Each dynamic sector 310 may also contain the URLs of the designated seeders 121 to verify that each dynamic sector 310 is a validated piece of the content file 300. Each static sector 311 may also contain identifiers containing identifications of the sector itself and the content file 300 to which it belongs. Static sectors 311 may be delivered from a plurality of seeders 121 or from other clients 101. The source of the static sectors 311, therefore, may not always be verified.

According to one embodiment, a dynamic sector 310 is associated with a static sector 311. A static sector 311 might have the size of the static sector 311 and the corresponding dynamic sector 310 combined, but the portion of the dynamic sector 310 may be filled with meaningless digits, for example, zeros. When the corresponding dynamic sector 310 is delivered, the checksum or the hash of the static sector 311 is checked before substituting the dynamic sector 310 with valid data. Each static and dynamic sector may be delivered concurrently or sequentially until the entire content file 300 is delivered.

According to one embodiment, the distributed content file 300 is broken into smaller sectors, such as, for example dynamic sector 310 and static sector 311, to add identifiers and URLs in each sector. Alternatively, identifiers and URLs may not be added, but the exact locations and sizes of the dynamic and static sectors are predetermined. In this case, each dynamic and static sector is treated as a separate file and obtained in separate packets. After all the required pieces of dynamic and static sectors are obtained, the dynamic and static sector pairs are reassembled to reconstruct content file 300. The reconstruction of the file may be verified by using a hash algorithm. If the file reconstruction fails, the client reports the failure within a given time frame so that the management server 110 determines whether the delivery has indeed failed or the report of the failure is a false positive.

According to one embodiment, a client program is used to reconstruct the content file. According to another embodiment, a client program to reconstruct the downloaded or streamed file is also delivered from the management server 110 or the publisher server 130. In another embodiment, a client program is concatenated to the original content file and delivered as a dynamic sector 310 of the content file 300. After all the dynamic and static sectors of the requested file are delivered, the management server 110 knows that the client 101 successfully obtained the requested file. The special client program might send a report of the status of the delivery to the management server 110 as confirmation of the file delivery.

The sizes and the numbers of the dynamic sectors 310 might vary. As the file size grows, it is prudent to insert more dynamic sectors 310 interspersed by larger-sized static sectors.

According to one embodiment, the content file 300 is transmitted to the client 101 in a decrypted form. For the delivery of sensitive files, encrypting and decrypting is highly recommended for added security. The decrypter might be attached to the content file so that it is delivered as a special dynamic sector. After the delivery of the content file is completed, the client 101 decrypts the content file 300 by using the decrypter contained in the file.

According to one embodiment, the content file 300 is a multimedia file. The content file 300 may be delivered as encoded in various formats such as MPEG, MPEG4, Microsoft Windows media video (WMV), RealPlayer, and the like. Strategic insertion of dynamic sectors 310 advantageously discourages unauthorized clients from obtaining the file. According to one embodiment, the proportions and location of dynamic and static sectors may be tunable for optimized security and traceability. For example, a content file may contain 20 dynamic sectors and 80 static sectors, or 1 dynamic sector and 99 static sectors. When the numbers of dynamic sectors and static sectors mismatch, the excessive dynamic or static sectors may still be treated as a dynamic/static sector pair having a corresponding static or dynamic sector of size zero. Typically, the more and/or the bigger the dynamic sectors are, the slower the download or streaming speed is since the bandwidth of the designated seeder 121 might be limited or slow. Depending on the needs and the requirements of the publisher, the proportions of dynamic and static sectors and the delivery thereof over the network may be tuned for optimal results.

As explained earlier, pairs of dynamic and static sectors may be delivered in separate packets, typically from different sources. After a certain amount and sectors of the requested file are delivered, the file starts playing on the user's device while the rest of the file is continuously being delivered. Hence, some embodiments are configured to stream the distributed content.

The streaming of multimedia files is generally uninterrupted unless the connection between the server and the client is lost. However, streaming using the tunable content distribution system 100 may be interrupted if an unauthorized streaming is detected.

Figure 4:
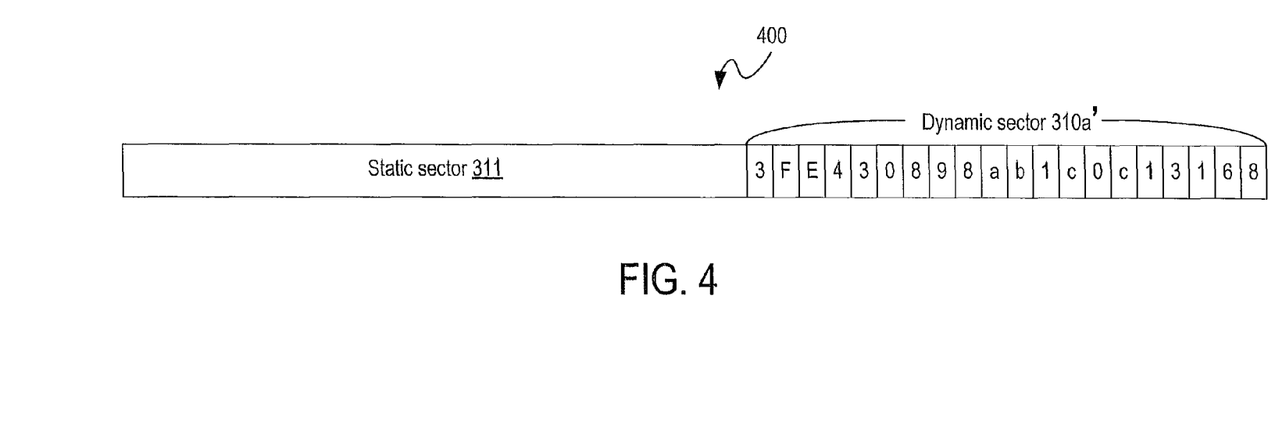
FIG. 4 illustrates an authenticated pair of dynamic and static sectors of a content file, according to one embodiment.

According to one embodiment, each static and dynamic sector has an identifier to identify its relative location within the content file 300. The portion of the content file 300 corresponding to an unauthenticated dynamic sector 310*a* may be originally filled with meaningless digits, in this case zeros. Advantageously, the unauthenticated dynamic sector 310*a* may be filled later with data for an authenticated dynamic sector 310*a*-prime (310*a*'), as shown in FIG. 4. For instance, the data for the authenticated dynamic sector 310*a*' may be delivered in a separate packet. The genuineness of static sector 311 at this point may not be identifiable. Accordingly, the dynamic sector 310*a* may be used to inspect the genuineness of the corresponding static sector 311 in several ways: The identifier of the static sector 311 is compared with the identifier of the dynamic sector 310*a*; or the checksum of the static sector 311 is checked; or the hash of the static sector 311 is checked against the predetermined hash available on the dynamic sector 310*a*.

FIG. 4 illustrates an authenticated pair of dynamic and static sectors of a content file, according to one embodiment. When the authentication of the static sector 311 and the corresponding dynamic sector 310*a* is verified, the dynamic sector 310*a* is substituted with the authenticated dynamic sector 310*a*' that is separately delivered. If an authentication error is detected, unauthenticated dynamic sector 310*a* may remain unsubstituted and the pair is incomplete, thereby nullifying the delivery of the pair. The process continues until the entire content file 300 is verified in pairs to finish the file delivery.

According to one embodiment, the client 101 may be a personal computer (PC), a smart phone, a BLACKBERRY™ of Research in Motion, an iPhone of Apple Computer, a digital set-top box, a digital video recorder, or any other media playback, consumption, and/or storage device including network-capable consumer electronic devices.

Preferably, the dynamic sectors 310 of a content file 300 have digital rights management (DRM) information and/or a watermark. It is also possible to add watermarks to dynamic sectors 310 that are unique for a client, so that the unauthorized copy can be traced or intercepted by the management server 110 when a request for a watermarked dynamic sector from an unauthorized client is made.

Figure 5:
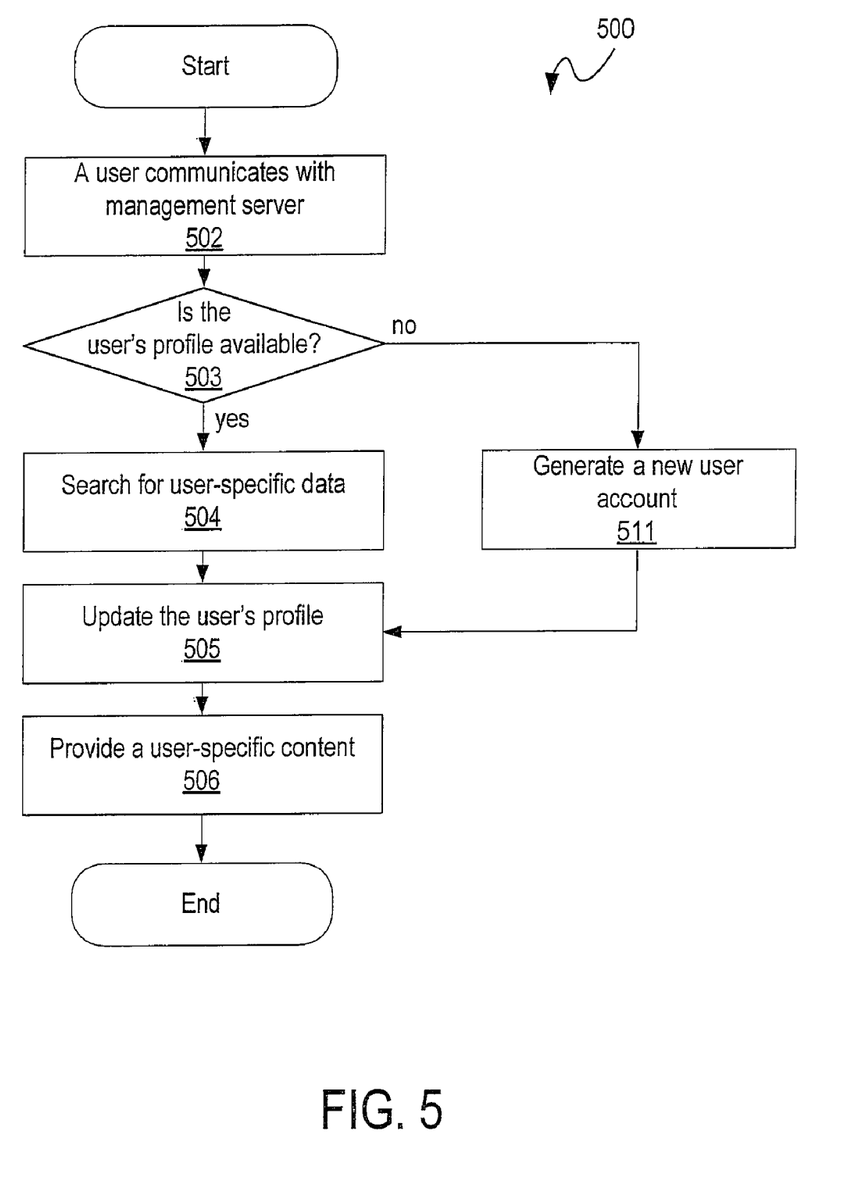
FIG. 5 illustrates a flow chart of an exemplary user-specific content distribution process using a tunable content distribution system, according to one embodiment.

FIG. 5 illustrates a flow chart of an exemplary user-specific content distribution process 500 for a tunable content distribution system, according to one embodiment. The process 500 begins when a user's client communicates with a management server via a network (at a step 502). The user's client may automatically establish communication with the management server. The management server may identify the user's client by using various identification methods. For example, the IP address, serial number or a Media Access Control (MAC) address of the user's client may be used. In another example, the cookie information in the user's client may be used. In a further example, the user's request for access may be used to identify the user's identity. For instance, when the user starts to play DVD and/or Blu-ray disc type content such as a movie, the license associated with the content and/or movie may be transmitted to the management server to identify the user.

When the management server identifies the user, the user's profile is searched in a database (at a step 503). If the user's profile is available, the management server searches the user's profile (step 504), updates the user's profile (step 505), and provides user-specific content for the user (step 506). If the user's profile is unavailable, at the step 503, a new user's profile is generated (at a step 511) and updated (at the step 505). The user's profile may be initially provided by the user and updated as the user communicates with the management server. By monitoring the user's activity in the tunable content distribution system, the management server analyzes the user's interests, tendencies, preferences, favorite topics, etc., and updates the user's profile accordingly (step 505). For example, when a user requests to obtain content such as a movie, the user is provided with a trailer of other movies under the same category (step 506).

Figure 6:
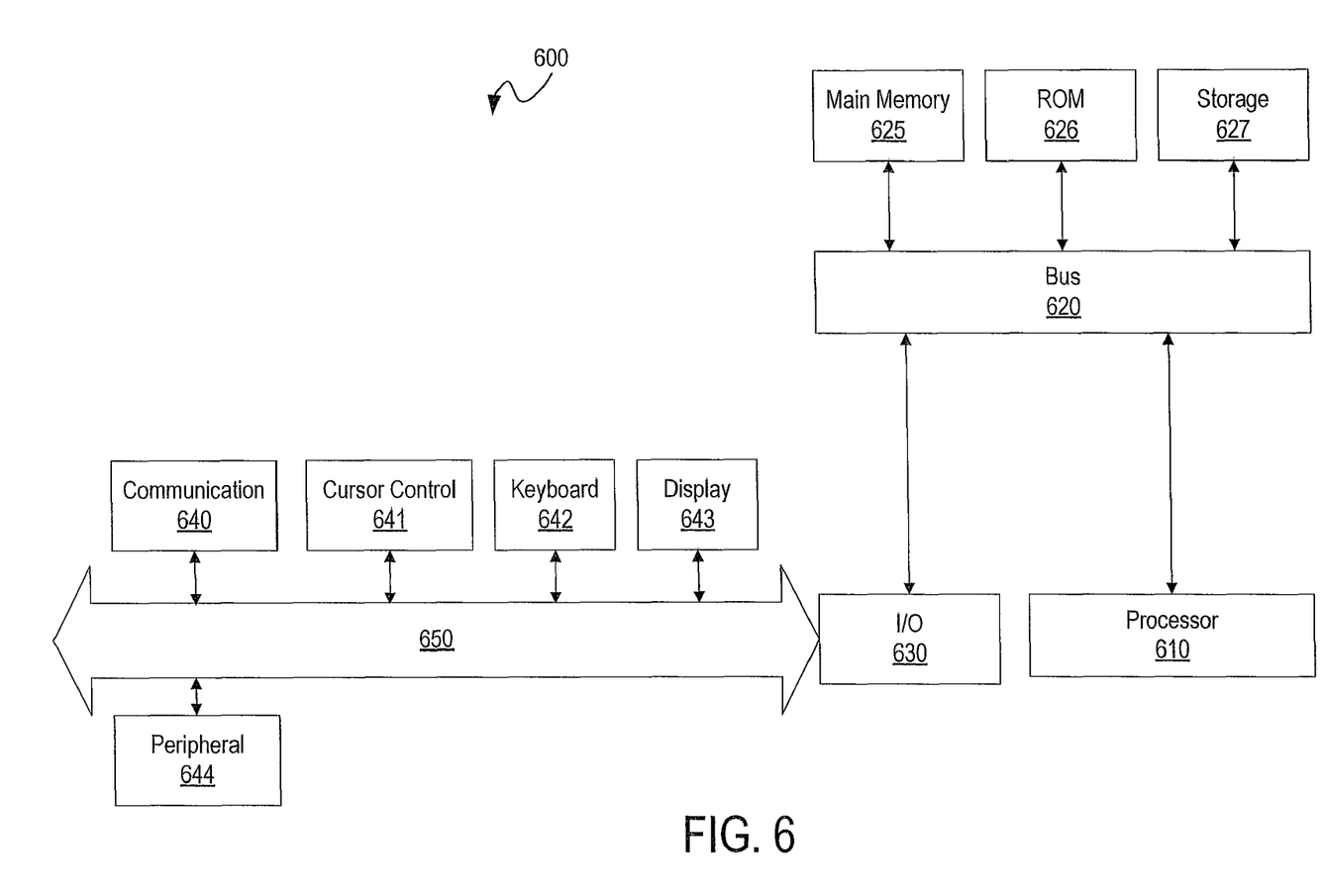
FIG. 6 illustrates an exemplary computer system for use with the system of some embodiments.

FIG. 6 illustrates an exemplary computer system 600 for use with the system of some embodiments. The computer system 600 may be, for example, a user device, a user computer, a client computer and/or a server computer, among other things. Examples of a user device include without limitation a Blu-ray Disc player, a personal media device, a portable media player, an iPod™, a Zoom player, a laptop computer, a palmtop computer, a netbook computer, a smart phone, a cell phone, a mobile phone, an MP3 payer, a digital audio recorder, a digital video recorder, a CD player, a DVD player, an IBM-type personal computer having an operating system such as MICROSOFT WINDOWS™, an APPLE™ computer having an operating system such as MAC-OS, hardware having a JAVA-OS operating system, and a Sun Microsystems Workstation having a UNIX operating system.

The computer system 600 may be used to implement a tunable content distribution system 100 with all or a part of the components shown in FIG. 1. One embodiment of the computer system 600 comprises a system bus 620 for communicating information, and a processor 610 coupled to the bus 620 for processing information.

The processor 610 may include without limitation a single microprocessor, or may include a plurality of microprocessors for configuring the computer system 600 as a multiprocessor system. The computer system 600 further comprises a random access memory (RAM) or other dynamic storage device 625 (referred to herein as main memory), coupled to the bus 620 for storing information and instructions to be executed by the processor 610. The main memory 625 also may be used for storing temporary variables or other intermediate information during execution of instructions by the processor 610. If the computer system 600 for storing an internal identifier in metadata is partially implemented in software, the main memory 625 stores the executable code when in operation. The main memory 625 may include banks of dynamic random access memory (DRAM), as well as cache memory.

The computer system 600 also may include a read only memory (ROM) and/or other static storage device 626 coupled to the bus 620. The storage device 626 is preferably a nonvolatile storage device for storing information and/or instructions for use by the processor 610. The storage device 626, which may be implemented, for example, with a magnetic disk drive or an optical disk drive. In a software embodiment, the storage device 626 is preferably configured for loading contents of the storage device 626 into the main memory 625.

The storage device 626 may be a portable storage medium device operating in conjunction with a nonvolatile portable storage medium, such as, for example, a compact disc read only memory (CD-ROM), to input and output data and code to and from the computer system 600. In some embodiments, the software for storing an internal identifier in metadata may be stored on a portable storage medium, and may be inputted into the computer system 600 via the storage device 626.

A data storage device 627 such as a flash memory, a magnetic disk or optical disc and its corresponding drive may also be coupled to the computer system 600 for storing information and instructions. The computer system 600 can also be coupled to a second I/O bus 650 via an I/O interface 630. A plurality of I/O devices may be coupled to the I/O bus 650, including a display device 643, an input device (e.g., an alphanumeric input device 642 and/or a cursor control device 641), and a peripheral device 644. However, the computer system 600 is not so limited to be coupled to the I/O bus 650, and devices of the computer system 600 may be coupled through one or more data transport means. For example, the processor 610 and/or the main memory 625 may be coupled via a local microprocessor bus. The storage 627, the communication device 640, the storage device 626, the cursor control device 641, and/or the display 643 may be coupled via one or more input/output I/O buses.

The peripheral device 644 may include any type of computer support device, such as, for example, an input/output I/O interface configured to add additional functionality to the computer system 600.

In order to display textual and graphical information, the computer system 600 includes the display device 643. The display device 643 may include a cathode ray tube (CRT) display, a plasma display, and/or a liquid crystal display (LCD). The display device 643 may include a graphical processor that receives textual and graphical information, and processes the information for output to the display device 643.

The input device 642 and/or the cursor control device 641 provide a portion of the user interface of a user of the computer system 600. The input device 642 may include a keypad. The keypad may be configured for inputting alphanumeric and/or other key information. The cursor control device 641 may include, for example, a mouse, a trackball, a stylus, and/or cursor direction keys.

The communication device 640 allows for access to other computers (servers or clients) via a network. The communication device 640 may comprise a modem, a network interface card, a wireless network interface or other well known interface device, such as those used for coupling to Ethernet, token ring, or other types of networks.

Each component of the computer system 600 may represent a broad category of a computer component of a general/special purpose computer. Components of the computer system 600 are not limited to the specific implementations provided herein.

Portions of the detailed descriptions may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments of the invention also relate to apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, mini disks, optical disks, Blu-ray disks, DVDs, CD-ROMs, micro-drive, magneto-optical disks, read-only memories (ROMs), random access memories (RAMs), EPROMs, EEPROMs, DRAMs, VRAMs, flash memories, flash cards, magnetic cards, optical cards, nanosystems, molecular memory integrated circuits, redundant array of inexpensive disks (RAIDs), remote data storage/archive/warehousing, and/or any type of non-transitory media suitable for storing electronic instructions, and each coupled to a computer system bus.

Stored on any one of the computer readable medium/media, some implementations include software for controlling both the hardware of the general/special computer or microprocessor, and for enabling the computer or microprocessor to interact with a human user or other mechanism utilizing the results of the invention. Such software may include without limitation device drivers, operating systems, and user applications. Ultimately, such computer readable media further include software for performing aspects of the invention, as described above. Included in the programming/software of the general/special purpose computer or microprocessor are software modules for implementing the processes described above.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A method and system for tunable distribution of content such as by using a multipoint distribution mechanism has been described. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method comprising:
   receiving a request from a client;
   determining, by use of a processor, one or more content files related to the request and a user profile of a user operating the client;
   assigning one or more seeders to start the delivery of the one or more content files; and
   delivering a plurality of pieces of the one or more content files to the client from the one or more seeders, at least one piece of the plurality of pieces of the one or more content files having embedded therein digital rights information, the digital rights information including information enabling tracing and management of the distribution of a particular content file in which the digital rights information is embedded;
   wherein the plurality of pieces of the one or more content files comprises a plurality of dynamic sectors and a plurality of static sectors and wherein each dynamic sector of the plurality of dynamic sectors corresponds to a static sector of the plurality of static sectors; and
   each dynamic sector contains the URLs of the designated seeders to verify that each dynamic sector is a validated piece of the content file; and when the corresponding dynamic sector is delivered, the checksum or the hash of the static sector is checked before substituting the dynamic sector with valid data.

2. The computer-implemented method of claim 1 further comprising:
   saving the user profile; and
   determining whether the user has authorization for the plurality of pieces of the one or more content files by using the user profile.

3. The computer-implemented method of claim 2, further comprising:
   analyzing one or more of the user's interests, tendencies, preferences, favorite topics from the request; and
   updating the user profile.

4. The computer-implemented method of claim 1, wherein each seeder comprises a content file that contains at least one of:
   a dynamic sector of the plurality of the dynamic sectors and
   a static sector of the plurality of static sectors.

5. The computer-implemented method of claim 1 further comprising reconstructing
   the one or more content files by using the plurality of dynamic sectors and the plurality of static sectors.

6. The computer-implemented method of claim 1, wherein the one or more content files are multimedia files.

7. The computer-implemented method of claim 1, wherein the one or more seeders include a peer.

8. The computer-implemented method of claim 1,
   wherein the request is authorized by using a proof of purchase of the one or more content files,
   wherein the authorization is by a management server.

9. The computer-implemented method of claim 8, wherein the management server exclusively distributes the at least one piece of the plurality of pieces of the one or more content files.

10. The computer-implemented method of claim 1, wherein each dynamic sector of the plurality of dynamic sectors is filled with zero bits when delivered from an unauthorized seeder.

11. The computer-implemented method of claim 10, wherein the dynamic sector filled with zero bits is substituted with the corresponding authorized dynamic sector, and wherein the authorized dynamic sector is delivered from an authorized seeder.

12. The computer-implemented method of claim 1, wherein each of the plurality of dynamic sectors is encoded.

13. The computer-implemented method of claim 12, further comprising decoding the plurality of dynamic sectors to reconstruct the one or more content files.

14. The computer-implemented method of claim 12, wherein the one or more content files contain a codec to decode the plurality of dynamic sectors.

15. The computer-implemented method of claim 1, further comprising tracing the delivery of the plurality of pieces of the one or more content files by using a tracking server.

16. The computer-implemented method of claim 15 further comprising reporting the status of the delivery of at least one piece of the plurality of pieces of the one or more content files when the delivery is commenced.

17. The computer-implemented method of claim 1, wherein the plurality of dynamic sectors are distributed exclusively by a publisher server.

18. The computer-implemented method of claim 17, wherein the publisher server determines the size of each dynamic sector of the plurality of dynamic sectors and the size of each static sector of the plurality of static sectors prior to distributing the one or more content files.

19. The computer-implemented method of claim 1, further comprising dynamically assigning a new seeder or a peer during the delivery of the one or more content files.

20. The computer-implemented method of claim 1, wherein the shared network is a home network.

21. The computer-implemented method of claim 1, wherein the one or more content files are delivered to one of a BD-Live capable player, a computer, a smart phone, a digital set-top box, and a digital video recorder.

22. The computer-implemented method of claim 1, wherein the one or more content files comprise a BD+ format.

23. A non-transitory computer readable medium having stored thereon a plurality of instructions, the plurality of instructions when executed by a computer, cause said computer to perform:
   receiving a request from a client;
   determining one or more content files related to the request and a user profile of a user;
   assigning one or more seeders to start the delivery of the one or more content files; and
   delivering a plurality of pieces of the one or more content files to the client from the one or more seeders, at least one piece of the plurality of pieces of the one or more content files having embedded therein digital rights information, the digital rights information including information enabling tracing and management of the distribution of a particular content file in which the digital rights information is embedded, the plurality of pieces of the one or more content files comprises a plurality of dynamic sectors and a plurality of static sectors and each dynamic sector of the plurality of dynamic sectors corresponds to a static sector of the plurality of static sectors;
   wherein each dynamic sector may also contain the URLs of the designated seeders to verify that each dynamic sector is a validated piece of the content file; and when the corresponding dynamic sector is delivered, the checksum or the hash of the static sector is checked before substituting the dynamic sector with valid data.

24. A multipoint system comprising:
   a plurality of clients, each of the plurality of clients being coupled to a network;
   a management server computer coupled to the network, the management server computer including a memory; and
   a plurality of seeders coupled to the network for distributing a plurality of content files, each of the plurality of content files having a least one piece having embedded therein digital rights information, the digital rights information including information enabling tracing and management of the distribution of a particular content file in which the digital rights information is embedded, the management server upon receiving a request from a user operating a first client of the plurality of clients determines one or more content files of the plurality of content files related to the request, the management server uses a user profile of the user operating the first client and assigns one or more seeders of the plurality of seeders to allow the delivery of the one or more content files, the one or more content files are delivered to the first client from the one or more seeders of the plurality of seeders, the plurality of pieces of the one or more content files comprises a plurality of dynamic sectors and a plurality of static sectors and each dynamic sector of the plurality of dynamic sectors corresponds to a static sector of the plurality of static sectors; and
   wherein each dynamic sector may also contain the URLs of the designated seeders to verify that each dynamic sector is a validated piece of the content file; and when the corresponding dynamic sector is delivered, the checksum or the hash of the static sector is checked before substituting the dynamic sector with valid data.

* * * * *